US008329033B2

(12) United States Patent
Klein et al.

(10) Patent No.: US 8,329,033 B2
(45) Date of Patent: Dec. 11, 2012

(54) FUEL SUPPLY DEVICE, PARTICULARLY FOR AN INTERNAL COMBUSTION ENGINE

(75) Inventors: Martin Klein, Stuttgart (DE); Steffi Kiedaisch, Göppingen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 371 days.

(21) Appl. No.: 12/600,411

(22) PCT Filed: Apr. 29, 2008

(86) PCT No.: PCT/EP2008/055243
§ 371 (c)(1),
(2), (4) Date: Jan. 14, 2010

(87) PCT Pub. No.: WO2008/138749
PCT Pub. Date: Nov. 20, 2008

(65) Prior Publication Data
US 2010/0132657 A1 Jun. 3, 2010

(30) Foreign Application Priority Data
May 16, 2007 (DE) ............... 20 2007 007 120 U

(51) Int. Cl.
*B01D 29/00* (2006.01)
*B01D 35/00* (2006.01)
(52) U.S. Cl. ........ 210/252; 210/259; 210/314; 210/316; 210/336; 210/416.4; 210/428; 210/455
(58) Field of Classification Search .................. 210/252, 210/259, 300, 310, 316, 320, 336, 446
See application file for complete search history.

(56) References Cited

U.S. PATENT DOCUMENTS

| 2,739,713 | A | * | 3/1956 | Robinson | 210/338 |
| 3,187,895 | A | | 6/1965 | Pall et al. | |
| 3,487,932 | A | * | 1/1970 | Forrester et al. | 210/130 |
| 4,253,954 | A | | 3/1981 | Midkiff et al. | |
| 4,384,962 | A | * | 5/1983 | Harris | 210/788 |
| 6,422,396 | B1 | * | 7/2002 | Li et al. | 210/489 |
| 2007/0125695 | A1 | * | 6/2007 | Pichler | 210/314 |
| 2007/0241044 | A1 | | 10/2007 | Abreu et al. | |
| 2009/0166301 | A1 | * | 7/2009 | Ringenberger | 210/767 |

FOREIGN PATENT DOCUMENTS

| DE | 3440506 | 5/1986 |
| DE | 102004032251 | 1/2006 |
| EP | 0699462 | 3/1996 |
| GB | 2109695 | 6/1983 |
| GB | 2138693 | 10/1984 |
| JP | 2004305921 | 11/2004 |

OTHER PUBLICATIONS

Search report on international application PCT/EP2008/055243 (published application with search report filed herewith).

* cited by examiner

*Primary Examiner* — Benjamin Kurtz
(74) *Attorney, Agent, or Firm* — James Hasselbeck

(57) ABSTRACT

A fuel supply device (1), particularly for an internal combustion engine (6), is equipped with a particulate filter and a water trap. In order to improve the separation effect, while simultaneously reducing the separation material that is required, it is proposed to configure the water trap (5, 8, 30) as a separate component connected downstream of the fuel filer (4) and to provide it with a first separation stage made of coalescent material and a second separation stage made of hydrophobic material, and to dispose the separation stages such that between them the fuel is diverted.

8 Claims, 4 Drawing Sheets

FUEL SUPPLY DEVICE, PARTICULARLY FOR AN INTERNAL COMBUSTION ENGINE

CROSS REFERENCE TO RELATED APPLICATIONS

This application is US National Stage Entry of international patent application no. PCT/EP2008/055243, filed Apr. 29, 2008 designating the United States of America. Priority is claimed based on Federal Republic of Germany patent application no. DE 20 2007 007 120.5, filed May 16, 2007, the entire disclosure of which is incorporated herein by reference.

TECHNICAL FIELD

The invention concerns a fuel supply device, in particular for an internal combustion engine, of the kind defined in the preamble of claim 1.

PRIOR ART

EP 1 256 707 A2 discloses a fuel filter with water-separating means. This fuel filter that is provided in particular for diesel fuel of an internal combustion engine comprises two filter stages wherein a first filter stage is provided for particulate filtration. This filter stage is comprised of a hydrophilic filter material that has the property that it causes finely divided water contained in the fuel to coalesce to larger water particle elements. The first filter stage is followed by a second filter stage of a hydrophobic material wherein this second filter stage is located coaxially within the first filter stage. This arrangement is selected in this way so that the fuel exiting from the first filter stage and containing water impinges without being diverted onto the material of the last filter stage.

For this kind of configuration of a fuel filter large surface areas of the hydrophobic material of the first stage as well as of the hydrophilic material of the second stage are required. It is also considered a disadvantage that already coalesced water particle elements are moved together with the fuel flow against the second filter stage and that by means of the second filter stage still a large proportion of water elements must be separated.

The present invention has therefore the object to provide a fuel supply device of the aforementioned kind by means of which a reliable water separation capability with significantly reduced quantity of coalescent material and hydrophobic material is provided.

This object is solved by a fuel supply device having the features of claim 1.

SUMMARY OF THE INVENTION

With the invention a fuel supply device is provided in which the water separator is independent of the fuel filter, i.e. the particulate filter, so that each one of these components can be optimally designed with regard to their respective tasks. It has been found in this connection that the required surface areas for water separation and the media required therefor can be significantly reduced and, depending on the application, the hydrophilic and hydrophobic materials with respect to their surface area can be designed to be 15 times to 50 times smaller, depending on the application, in comparison to conventional arrangements in which they are combined with particulate filters. A further improvement with respect to the separation performance is provided by diverting the fuel between the first and the second separating stages.

According to a first embodiment of the invention the first separating stage comprises at least one layer of hydrophilic medium. In this connection, the at least one layer of hydrophilic medium is substantially horizontally arranged. Passage of the fuel through the hydrophilic medium occurs vertically from top to bottom so that the water droplets exiting from the hydrophilic medium are already being moved in the direction toward a collecting chamber located in the lower area.

The second separating stage comprises preferably at least one layer of a hydrophobic medium wherein this layer of hydrophobic medium is arranged especially in a slanted position or is substantially vertical. A slanted or vertical arrangement has in this connection the advantage that the water droplets retained by the second separating stage as a result of their gravity will fall off the surface and will also be guided into the collecting chamber arranged underneath. The separation effect along the path of the fuel between the first and the second separating stages can be enhanced in that the flow of the fuel is diverted such that the angle of the flow path is 90 or greater, wherein the water components as a result of their greater mass inertia do not follow this diversion.

According to an expedient embodiment of the subject matter of the invention the water separator comprises a substantially cylindrical housing whose longitudinal axis is at least approximately vertical wherein in the housing an insertion element is provided that comprises a vertical tube section. The insertion element can be designed in accordance with the requirements and has preferably a circular ring-shaped support grid on which the hydrophilic material is arranged. Moreover, it is expedient that the tube section has radial openings that are covered by the hydrophobic material, wherein the radial openings are located in an area of the tube section that is vertically below the support grid.

An especially expedient embodiment of the fuel outlet is provided in that the fuel outlet adjoins the upper end of the tube section and is formed in a lid part of the housing. In this lid part preferably a fuel inlet chamber is formed that is substantially annular and into which an intake passage opens tangentially. In this way, a flow of fuel is achieved in the fuel inlet chamber by means of which the hydrophilic material of the first separating stage is loaded substantially uniformly. Moreover, it is expedient that at the lower end of the tube section a plate-shaped guiding element is arranged whose outer circumference has a spacing relative to the inner wall of the housing. In this way, it is achieved that the water components are guided along the guiding element in the direction toward the edge so that they can enter through the spacing that remains between it and the inner wall of the houing into the collecting chamber. In the upward direction the collecting chamber is substantially separated by the guiding element from the separating chamber formed thereabove. For simple manipulation during assembly the insertion element and the lid part may form a unit.

Another expedient embodiment of the subject matter of the invention resides in that the water separator has a substantially cylindrical housing with at least approximately horizontal longitudinal axis and in that in the housing an inner part is arranged that extends in the longitudinal direction of the housing and in which a fuel inlet chamber and a fuel outlet chamber are formed. This inner part may be secured in the housing by integrally formed disk elements and may be provided with sealing rings so that a sealing action of the collecting chamber for the separated water relative to the fuel inlet and the fuel outlet is provided.

Expediently, the fuel intake chamber has an elongate extension and has at its bottom side openings that are spanned by the hydrophilic material. In this embodiment, the fuel also passes through the hydrophilic material in a vertical direction from the top to the bottom so that the water droplets that exit from the hydrophilic material already have a movement direction toward the collecting chamber. In such a configuration of the housing and of the inner part, the fuel inlet chamber is preferably located above the longitudinal axis of the housing and the cavity of the housing formed below the fuel inlet chamber serves with the upper area as a separating chamber and with the lower area as a water collecting chamber. Moreover, it is expedient that in the housing above the inner part an intermediate chamber is formed from which an opening extends into the fuel outlet chamber, wherein this opening is covered by the hydrophobic material.

BRIEF DESCRIPTION OF THE DRAWINGS

Embodiments of the invention will be explained in the following with the aid of the drawing in more detail. The drawing shows in.

EMBODIMENT(S) OF THE INVENTION

Figure 1:
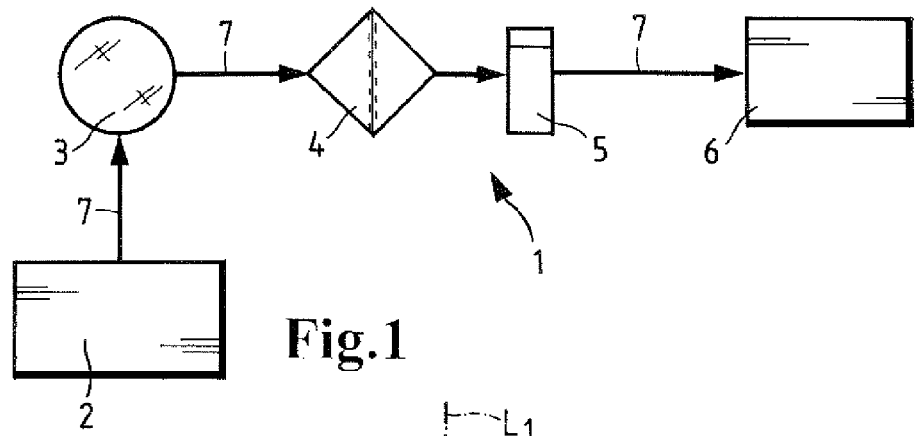
FIG. 1 a schematic illustration of a fuel conduit extending from a tank to an internal combustion engine.

In FIG. 1 a fuel supply 1 for an internal combustion engine 6 is schematically shown wherein in a fuel conduit 7 beginning at a fuel tank 2 sequentially a fuel pump 3, a fuel filter 4, and a water separator 5 are arranged. The fuel that is being conveyed by means of the fuel pump 3 from the fuel tank 2 is first purified in the fuel filter 4 by removing particulate material and is then supplied to a water separator 5. The functions "particulate filtration" and "water separation" are separated from one another and are realized in two separate components.

Figure 2:
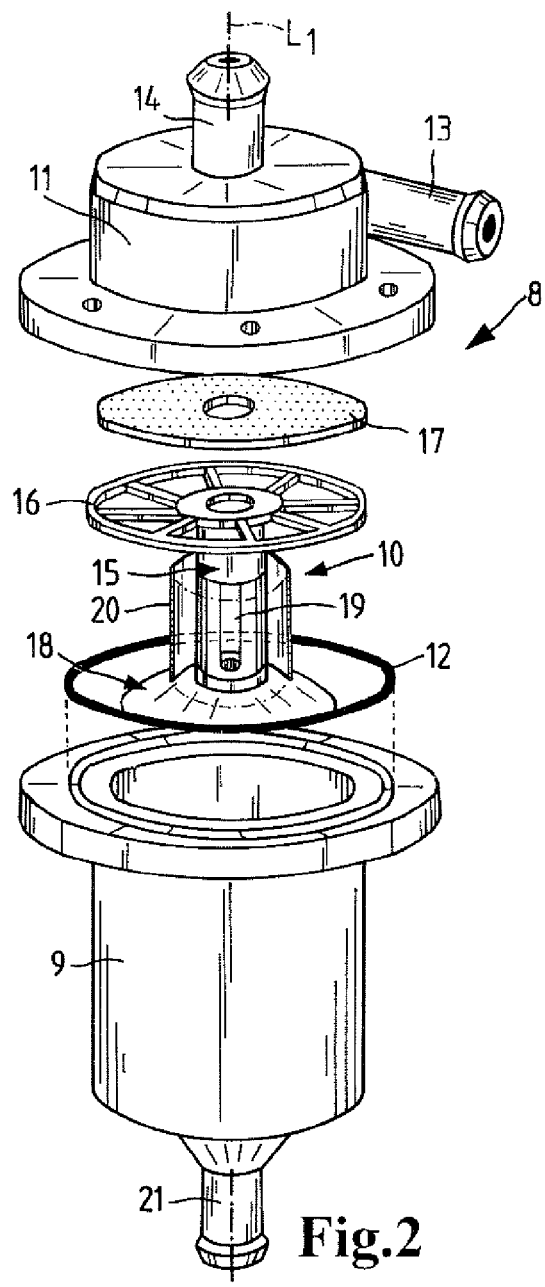
FIG. 2 a water separator in exploded view.

FIG. 2 shows in exploded view a water separator 8 that comprises a substantially cylindrical housing 9 as well as an insertion element 10 insertable therein and a lid part 11. Between the flanges of the housing 8 and of the lid part 11 an O-ring 12 is arranged for sealing purposes. On the lid part 11 an inlet passage 13 for the fuel that extends tangentially to a vertical longitudinal axis $L_1$ of the housing 8 and a fuel outlet 14 that extends coaxially to the longitudinal axis $L_1$ are provided. In the illustrated example the lid part 11, the inlet passage 13 and the fuel outlet are embodied as a monolithic part.

The insertion element 10 comprises a central tube section 15 having at its upper end a circular ring-shaped support grid 16 that surrounds the tube section 15 and onto which is to be placed an appropriate plate or layer 17 of hydrophilic material. The fuel outlet 14 projects within the lid part 11 so far downwardly that it is connected to the upper end of the tube section 15. At the lower end of the tube section 15 there is a plate-shaped guiding element 18. The tube section 15 has radial openings 19 in an area that in the vertical direction is below the support grid 16 and at a spacing thereto; the openings are covered by a layer or ply 20 of hydrophobic material.

The lower end of the housing 9 is funnel-shaped wherein at the lowermost position a water drainage socket 21 is arranged.

Figure 3:
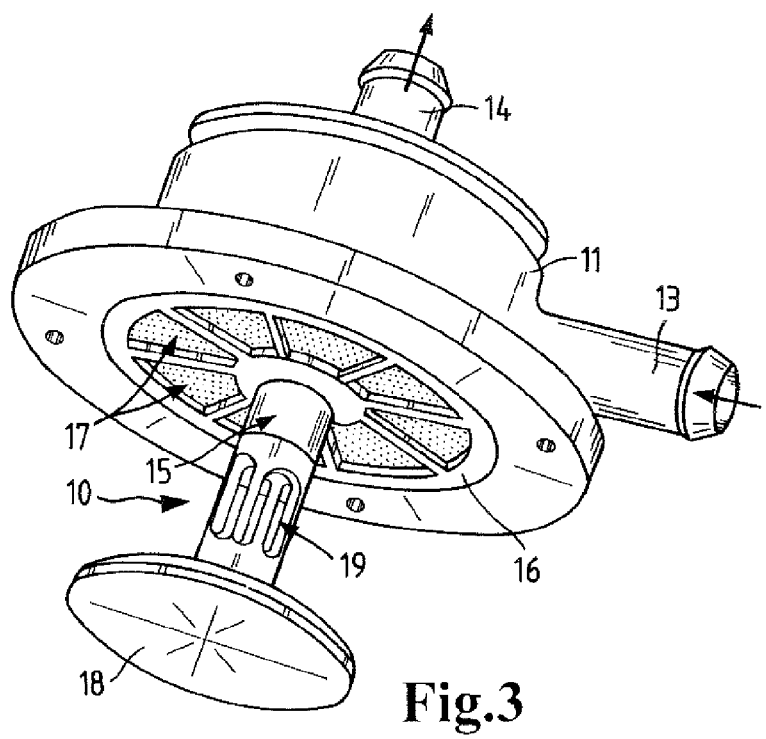
FIG. 3 a perspective view of a lid part with an insertion element.

FIG. 3 shows the lid part 11 with the insertion element 10 in an enlarged illustration. Here it can be seen that the tube section 15 has distributed about the circumference several radial openings 19 that, before assembly of the unit from insertion elements 10 and lid part 11 as well as housing 9, are provided with the layer 20 shown in FIG. 2 or several layers of hydrophobic material. For this purpose, this area of the tube section 15 is covered by winding a suitable material, for example, a screen fabric of polyamide, on it. At the lower end of the tube section 15 there is a guiding element 18 and at the upper end there is the support grid 16, with the layer 17 of hydrophilic material showing through its openings. On the lid part 11 there is the inlet passage 13 and the fuel outlet 14.

Figure 4:
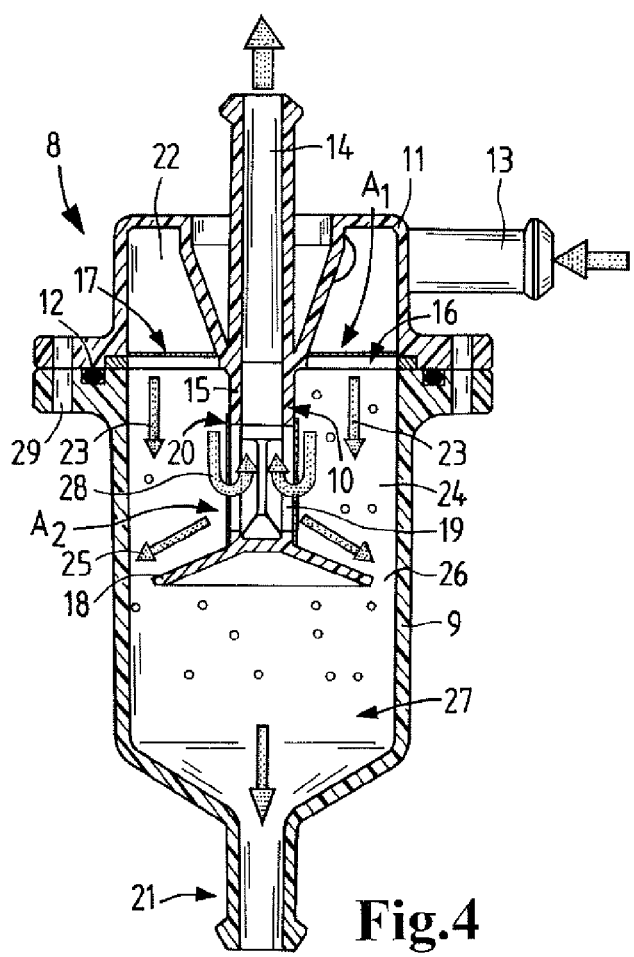
FIG. 4 a longitudinal section of the water separator with the individual parts according to FIG. 2.

FIG. 4 shows a longitudinal section of the water separator 8 according to FIG. 2. The housing 9 and the lid part 11 are joined at their respective flanges with interposition of an O-ring 12 and are fastened, for example, by screws, not shown, that are screwed into corresponding bores 29. In the lid part 11 an annular fuel inlet chamber 22 is formed into which the inlet passage 13 opens. The fuel inlet chamber 22 is delimited at its bottom side by the layer 17 of hydrophilic material that is resting on the support grid 16 of the insertion element 10 and therefore forms the first separating stage $A_1$. The fuel with water emulsified therein passes from the fuel inlet chamber 22 through the layer 17 of hydrophilic material that causes coalescence so that water droplets are formed that, like the fuel, have a flow direction in the direction of arrows 23 in vertical direction downwardly into the separating chamber 24. As a result of the greater mass the formed water droplets will maintain their direction wherein in addition the force of gravity acting on them also contributes to guiding the water droplets to the guiding element 18 and from there according to the arrows 25 to the annular gap 26 and through the latter into the collecting chamber 27. The annular gap 26 is large enough in order to allow water droplets to pass into the collecting chamber 27. In other respects, the guiding element 18 acts as a separation means between the separating chamber 24 and the collecting chamber 27. A valve, not shown in the drawing, adjoins the water drainage socket 21 and, only for the purpose of draining the water collected in the collecting chamber 27, the valve is opened briefly but otherwise remains closed.

The fuel that has been separated substantially from water components in the separator chamber 24 is moved as a result of the suction action of the internal combustion engine existing at the fuel outlet 14 through the radial openings 19 into the tube section 15 as indicated by the arrows 28. By means of the layer 20 of hydrophobic material that forms a second separating stage $A_2$ water that, despite the diversion of the fuel in the direction of the radial openings, is still entrained is retained by the layer 20 so that exclusively the fuel component passes through the radial openings 19 into the interior of the tube section 15. The water component retained at the layer 20 is guided, like the other water droplets contained in the separating chamber 24, through the annular gap 26 into the collecting chamber 27.

Figure 5:
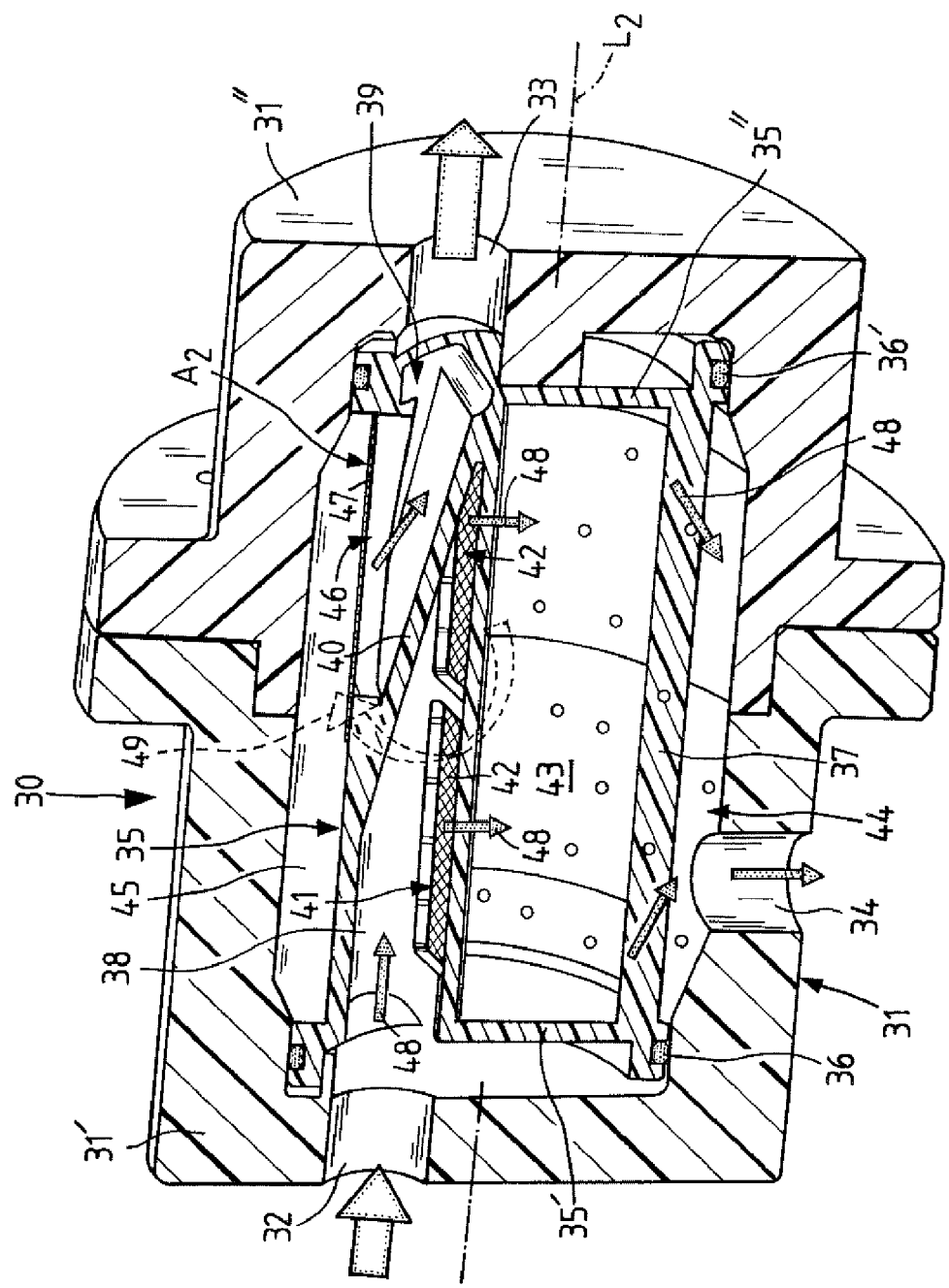
FIG. 5 a second embodiment of a water separator in longitudinal section.

FIG. 5 shows a further embodiment of a water separator 30 according to the invention in a slightly perspective longitudinal section. It comprises a substantially cylindrical housing 31 which is comprised of two housing parts 31' and 31" that are concentrically inserted into one another in the connecting area and are connected by flanges. The housing 31 assumes in the mounted state in the fuel supply device an at least approximately horizontal position relative to its longitudinal axis $L_2$.

At the end face in the housing part 31' an inlet opening 32 for the fuel is provided while an outlet opening 33 is arranged in the end face of the housing part 31". A water drainage opening 34 is provided at the bottom side of the housing 31 in the area of the outer wall surface of the housing part 31'.

Figure 9:
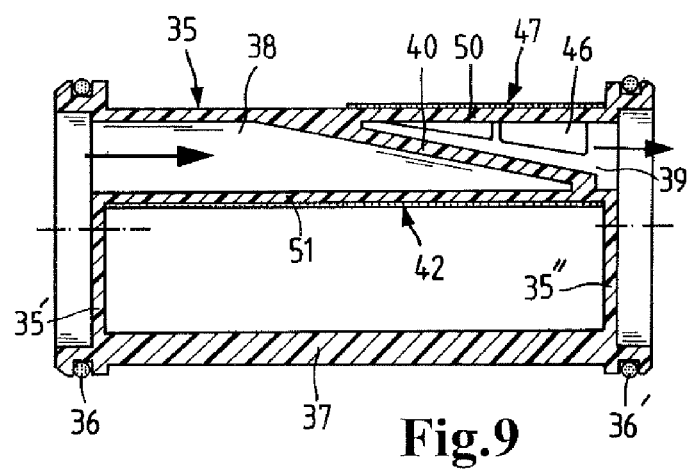
FIG. 9 a section along the line IX-IX in FIG. 8.

In the housing 31 an elongate inner part 35 is inserted that comprises terminal disks 35', 35" that serve for securing the inner part 35 in the hous-ing 31. The disks 35', 35" are provided at their circumferential surface with a sealing ring 36, 36', respectively. The elongate inner part 35 is arranged eccentrically to the longitudinal axis L2 and extends between the inlet opening 32 and the outlet opening 33. As can be seen from this illustration, the inner part is above the center of the housing 31 that is marked by the longitudinal axis L2. In order to stabilize the terminal disks 35' and 35", a support web 37 is provided. The inner part 35 is hollow and forms an inlet chamber 38 and an outlet chamber 39 that are separated by a slantedly positioned partition 40. As shown in FIGS. 5 and 9, the slantedly positioned partition 40 separates the inlet chamber 38 from the outlet chamber 39 with the outlet chamber 39 extending at least partially over the fuel inlet chamber 38.

The inner part 35 has a flat bottom that delimits the inlet chamber at its bottom side and is provided with openings 41 with a large surface. These openings are completely covered by a ply or layer 42 of hydrophilic material that forms the first separating stage $A_1$. Below the inner part 35 there is located as a result of the eccentric position a relatively large cavity whose upper part serves as a separating chamber 43 and whose lower part serves as a collecting chamber 44 for the separated water. Above the inner part 35 at a spacing to the inner wall of the housing 31 an intermediate chamber 45 is formed. On the wall of the inner part 35 that is positioned above the outlet chamber 39 there is an opening 46 that connects the intermediate chamber 45 with the outlet chamber 39. This opening 46 is covered by means of a layer 47 or several layers of a hydrophobic material that forms the second separating stage $A_2$.

The fuel containing emulsified water passes through the inlet opening 32 into the inlet chamber 38 and from there through the first separating stage $A_1$ with layer 42 into the separating chamber 43 in accordance with arrows 48 in a vertical direction downwardly. The coalescent effect of the separating stage $A_1$ has the result that the water component forms droplets. While as a result of mass inertia and gravitation force the water droplets are guided farther downwardly into the collecting chamber 44, a diversion of the fuel upwardly into the intermediate chamber 45 as indicated by arrow 49 takes place. From the intermediate chamber 45 the fuel passes through the layer 47 of hydrophobic material i.e., the second separating stage $A_2$ and the opening 46 into the outlet chamber 39 in order to pass from there into the intake system of the internal combustion engine. On the layer 47 the water component that may still have been entrained by the fuel flow is retained and, as a result of the curvature of the layer 47, is guided laterally away so that the water can drop into the collecting chamber 44.

Figure 6:
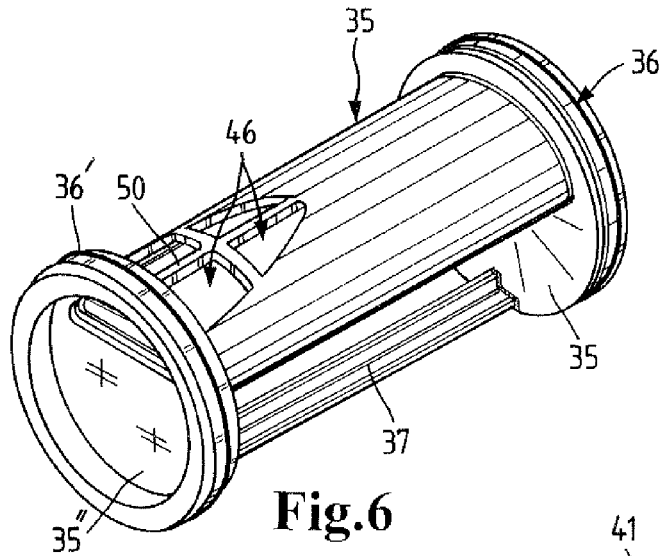
FIGS. 6 and 7 perspective illustrations of an inner part of FIG. 5.
Figure 7:
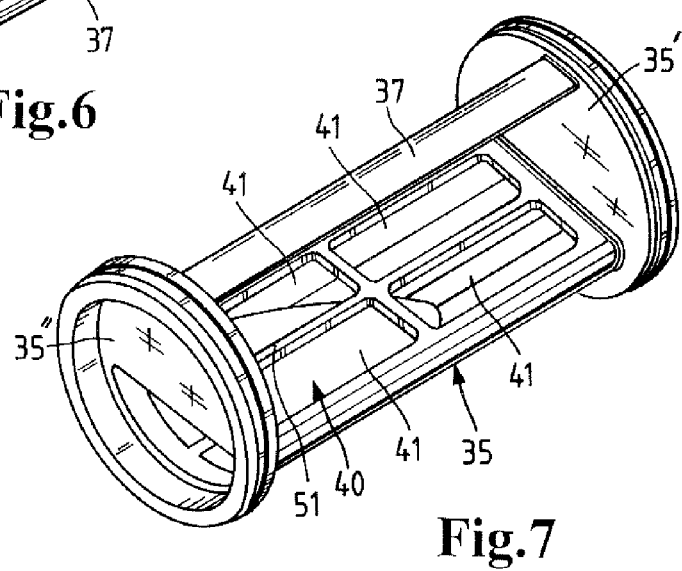

FIGS. 6 and 7 show two perspective illustrations of the inner part 35 that is provided for use in the water separator according to FIG. 5. For same parts the same reference numerals as in FIG. 5 are used. These illustrations show that the inner part 35 has terminal disks 35' and 35" having arranged at their outer circumference the seals 36 and 36'. Since the inner part 35 is arranged eccentrically to the terminal disks 35' and 35", the support web 37 provides mechanical stability and positional securing action of the disks 35' and 35" in the assembled state as illustrated in FIG. 5. FIGS. 6 and 7 show the position and shape of the respective openings 41 and 46 wherein the openings 46 have support webs 50 and the openings 41 have support webs 51 so that the layers of hydrophilic or hydrophobic material are safely secured. In FIG. 7 below the openings 41 the partition 40 is visible.

Figure 8:
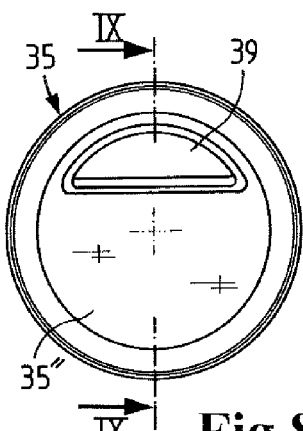
FIG. 8 an end view of the inner part according to FIG. 6.

FIG. 8 shows the end view of the inner part 35 looking onto the disk 35" as well as the outlet chamber 39. FIG. 9 shows the longitudinal section of the inner part 35 to the line IX-IX in FIG. 8. The reference numerals in FIG. 9 are the same as those in FIGS. 5 to 8 for same parts. It can be seen that the layer 42 is arranged on the bottom side of the inner part 35; this, for reasons of improved accessibility, is expedient for applying the layer 42. The layer 47 is located on the topside of the inner part 35 and is supported thereat by the support webs 50. With respect to further features in FIG. 9, reference is being had to the description of FIGS. 5 to 8.

The invention claimed is:

1. Fuel supply device (1) for an internal combustion engine (6), comprising
   a particulate filter and
   a water separator, wherein the water separator (5, 8, 30) is embodied as a separate component downstream of the particulate filter (4) and comprises
   a first separating stage (A1) with hydrophilic coalescent material as well as
   a second separating stage (A2) with hydrophobic material and wherein the separating stages (A1, A2) are arranged such that between them a diversion of the fuel is realized;
   a housing (31) having an at least approximately horizontal longitudinal axis (L2);
   an elongated inner part (35) arranged within the housing (31) and extending in longitudinal direction of the housing (31);
   wherein the elongated inner part is arranged eccentrically relative to the longitudinal axis (L2);
   wherein the elongated inner part includes
   a fuel inlet chamber (38) formed within said elongated inner part (35) and opening through an axial end of said elongated inner part;
   a fuel outlet chamber (39) formed within said elongated inner part (35) and arranged in direction of said approximately horizontal longitudinal axis (L2) axially behind said fuel inlet chamber (38), said fuel outlet chamber (39) extending at least partially over said fuel inlet chamber (38) and opening through an opposing axial end of said elongated inner part;
   a slantedly positioned partition (40) arranged between said fuel inlet chamber (38) and said fuel outlet chamber (39), said partition separating said fuel inlet chamber from said fuel outlet chamber;
   a separating chamber (43) arranged within said housing (31) below said axially spaced fuel inlet and outlet chambers;
   a bottom wall of said a fuel inlet chamber (38) delimiting said fuel inlet chamber (38) at its bottom side and separating said fuel inlet chamber (38) from said separating chamber (43), said bottom wall having an opening (41) completely covered by at least one layer (42) of said hydrophilic material forming said first separating stage (A1).

2. Fuel supply device according to claim 1, wherein the at least one layer (42) of the hydrophilic material is arranged substantially horizontally and said separating chamber (43) is formed below.

3. Fuel supply device according to claim 1, wherein
the second separating stage (A2) comprises a layer (47) of hydrophobic material.

4. Fuel supply device according to claim 1, wherein
the surface of the hydrophobic material is curved.

5. Fuel supply device according to claim 1, wherein
the diversion of the flow of the fuel between the first and second separating stages (A1, A2) has an angle of at least 90 degrees.

6. Fuel supply device according to claim 1, wherein
the fuel inlet chamber (38) is located above the longitudinal axis (L2) of the housing (31) and
the cavity of the housing (31) below the fuel inlet chamber (38) serves as a separating chamber (43) and water collecting chamber (44).

7. Fuel supply device according to claim 1, wherein
above the inner part (35) in the housing (31) an intermediate chamber (45) is formed from which an opening (46) extends to the fuel outlet chamber (39) and
this opening (46) is covered by the hydrophilic material of the second separating stage (A2).

8. Fuel supply device for an internal combustion engine, comprising
a particulate filter and
a water separator;
wherein the water separator is embodied as a separate component downstream of the particulate filter and comprises
 a first separating stage (A1) with coalescent material;
 a second separating stage (A2) with hydrophobic material, wherein the separating stages (A1, A2) are arranged such that between them a diversion of the fuel is realized;
 a substantially cylindrical housing (31), the cylindrical housing having an at least approximately horizontal longitudinal axis (L2);
 end faces (35', 35") at opposing axial ends of said axis, first one of said end faces having an inlet opening (32) and
  second one of said end faces having an outlet opening (33);
 an elongated inner part (35) arranged within the cylindrical housing (31) and extending in longitudinal direction of the cylindrical housing (31);
wherein the elongated inner part is arranged eccentrically relative to the longitudinal axis (L2);
wherein the elongated inner part includes
 a first end disk (35') arranged at a longitudinal end of the elongated inner part;
 a second end disk (35") arranged at an opposing longitudinal end of the elongated inner part;
 a fuel inlet chamber (38) formed within said elongated inner part (35) and opening through said first end disk (35');
 a fuel outlet chamber (39) formed within said elongated inner part (35) and arranged in direction of said approximately horizontal longitudinal axis (L2) behind said fuel inlet chamber (38), said fuel outlet chamber (39) extending at least partially over said fuel inlet chamber (38) and opening through said second end disk (35");
 a slantedly positioned partition arranged axially between said fuel inlet chamber (38) and said fuel outlet chamber (39), said slantedly positioned partition separating said fuel inlet chamber from said fuel outlet chamber;
 a separating chamber (43) arranged within said elongated inner part (35) and arranged below said axially spaced fuel inlet chamber (38) and fuel outlet chamber (39);
 a support web (51) connected at opposing ends to said end disks (35', 35"), said support web (51) separating said fuel inlet chamber (38) from said separating chamber (43), said support web (51) having an opening (41) completely covered by said hydrophilic material forming said first separating stage (A1);
 a wall of said inner part above said fuel outlet chamber (39) having an opening (46) covered by said hydrophobic material (47) forming said second separating stage (A2).

* * * * *